H. C. FOX.
VAPORIZER AND BURNER.
APPLICATION FILED JUNE 4, 1913.

1,145,135.

Patented July 6, 1915.
2 SHEETS—SHEET 1.

Witnesses
Gerald Hennesy.
D. W. Gould.

Inventor
Henry Clay Fox,
By Victor J. Evans
Attorney

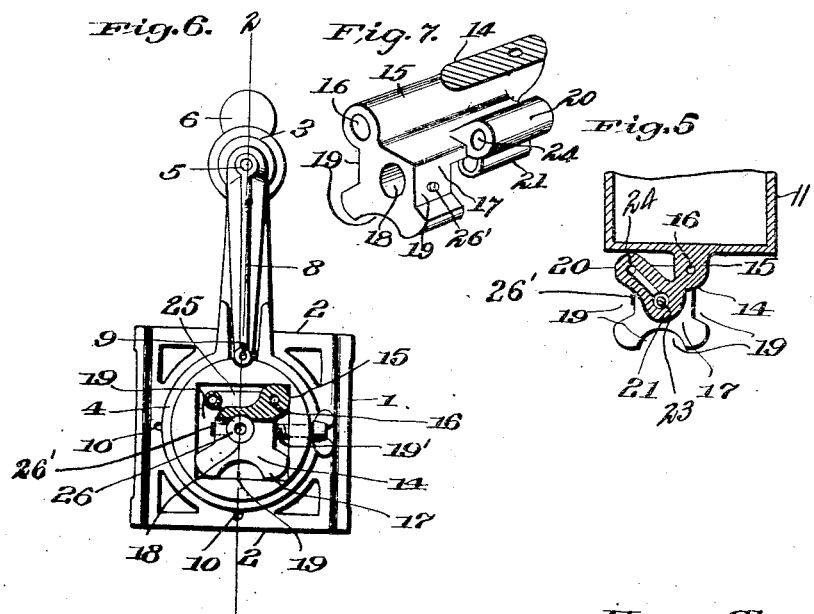

UNITED STATES PATENT OFFICE.

HENRY CLAY FOX, OF LOUISVILLE, KENTUCKY.

VAPORIZER AND BURNER.

1,145,135.  Specification of Letters Patent.  Patented July 6, 1915.

Application filed June 4, 1913. Serial No. 771,697.

*To all whom it may concern:*

Be it known that I, HENRY CLAY FOX, a citizen of the United States, residing at Louisville, in the county of Jefferson and State of Kentucky, have invented new and useful Improvements in Vaporizers and Burners, of which the following is a specification.

The invention relates to an improved heating element, designed particularly for use in self-heating sad irons, involving a construction wherein the fuel to be vaporized is subjected for vaporizing action to the heat from the burner which is utilized for heating the iron.

The main object of the present invention is the provision of a combined heating element designed for ready connection with or removal from a self-heating sad iron and involving a compact structure, whereby the fuel, under manual control, is admitted to the vaporizing tube within the influence of the burner and utilized for heating the iron, whereby the vaporization as well as burning of the fuel occurs within the body of the iron.

The invention in its preferred form of details will be described in the following specification, reference being had particularly to the accompanying drawings, in which:—

Figure 1:
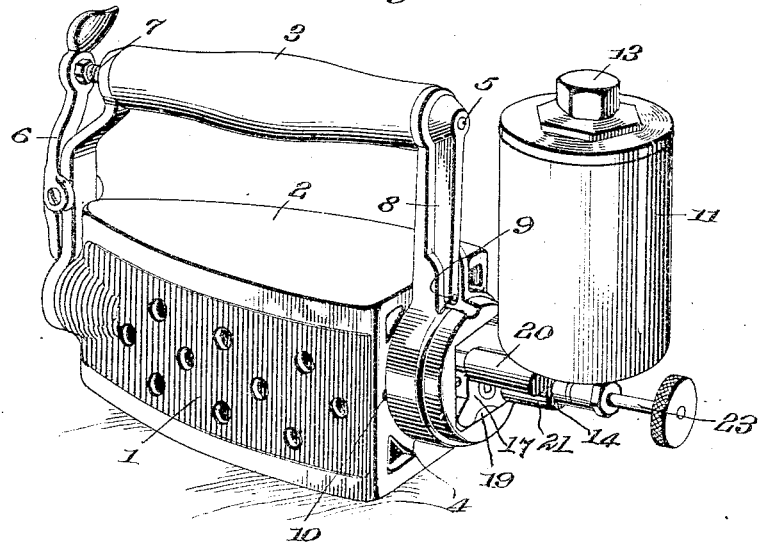
Figure 2:
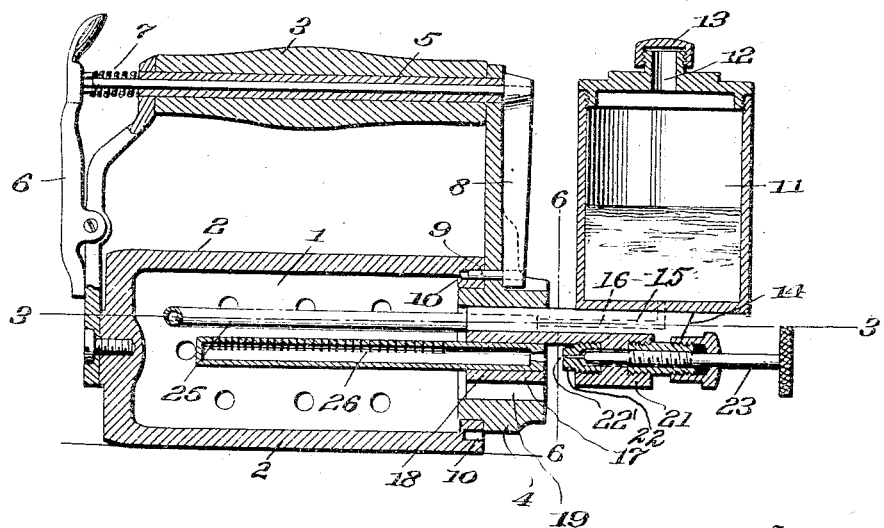

Figure 1 is a perspective view showing the improved vaporizer and sad iron. Fig. 2 is a longitudinal section taken on line 2—2 of Fig. 6. Fig. 3 is a horizontal longitudinal section taken approximately on line 3—3 of Fig. 2. Fig. 4 is a detail side elevation of the heating element with the tank partly broken away. Fig. 5 is a plan. Fig. 6 is a section on line 6—6 of Fig. 2. Fig. 7 is a detail perspective view of the distributing block with the tank broke away.

For the purpose of the present invention, it will be sufficient to describe the type of sad iron shown as comprising a body 1 having the usual opposing ironing surfaces 2 and a handle 3 pivotally connected at the opposite ends of the body. The handle at one end is pivotally connected to the body through a hollow sleeve like member 4 integral with the handle and forming an opening for the insertion into the body of the improved heating element. Slidably mounted in the horizontal or gripping portion of the handle member is a rod 5 operated at one end by a finger lever 6 pivotally mounted in the handle and spring pressed in opposition to said lever by a spring 7. The opposite end of the rod is connected to and operates an arm 8 which at the lower end, immediately adjacent the sleeve member carries a pin 9 adapted to coöperate with any one of a series of holes 10 formed in the end of the body, whereby the handle may be locked in different positions with respect to the body providing for turning the handle at right angles to or above either iron surface of the body.

The improved heating element includes what I term a tank or receptacle 11 having a filling opening 12 adapted to be sealed by a cap 13, the receptacle being of any appropriate size. Integral with the bottom of the tank is what I term a distributing block 14, by means of the various channels in which the fuel is distributed to the vaporizer and to the burner. The block 14 includes an arm 15 formed throughout its length with a channel 16 in communication with the tank through an opening in the bottom of the latter, the said channel opening through the end of the arm remote from the tank. Said arm is provided with an offset section 17, arranged below and to one side of the arm, said section being longitudinally and centrally cored at 18 for the reception of the burner tube as will later appear.

The sides and bottom of the section are formed to provide longitudinally extending recesses 19 to admit air between the section and the sleeve when the heating element is in place in the iron, and a set screw 19' is adapted to be passed through the member 4 of the handle and seat in a depression in one of the recesses 19, to secure the heating element to the iron, as clearly shown in Fig. 6. Spaced from the section 17 and arranged in spaced parallel relation to the arm 15 is a second arm 20, the latter terminating at its forward end beyond the receptacle. The vapor nozzle 21 is formed integral with the arm 20 depending below and to one side thereof, said nozzle alining with the bore 18 of the section. The forward end of the nozzle 21 is provided with a nozzle tip 22 whose opening 22' terminates in rear of the adjacent end of the bore 18. A needle valve 23 is operative in the nozzle 21 and serves to control the passage of fuel through the opening of the nozzle tip. The arm 20 is formed with a longitudinal channel 24 opening through the forward end of the arm and at the rear end communicating with the burner tube.

The vaporizer comprises a tube 25 arranged in elongated loop form with the ends connected to the respective arms 15 and 20 so that the tube is in open communication with the channels 16 and 24. The vaporizer thus establishes communication between the receptacle and the nozzle 21 and the length of the tube 25 beyond the arms constitutes the path of travel for the liquid fuel during the vaporization thereof. As thus arranged, the vaporizer projects beyond and approximately at right angles to the receptacle, the relative elevation of the receptacle providing a gravity feed from the receptacle to the feed tube. The burner proper, shown in the present instance as an elongated slotted tube 26, is secured in the bore 18 of the section 17 by a set screw 26'. As thus arranged the burner tube is alined and open to the delivery from the vapor nozzle, there being sufficient space between such delivery point from the vapor nozzle and the inlet to the burner tube to provide for the proper mixture of air with said gas prior to its entry to the burner tube.

The use of the improvement will be apparent from the above description taken in connection with the drawings, it being understood that the heating element is inserted into the body of the sad iron through the opening in the sleeve member 4, the section 17 being preferably secured to the sleeve member by the set screw 19', or any other appropriate means.

What is claimed is:—

A heating element including a fuel receptacle, a distributing block secured to the bottom thereof and including spaced fuel channels integrally connected together, a loop formed vaporizer establishing communication between said channels, a vapor nozzle carried by the block and in communication with one of said channels, a slitted burner tube carried by the block and receiving the fuel from the vapor nozzle, said burner tube underlying the loop formed vaporizer with the slits thereof disposed to discharge within said loop, and means for controlling the passage of fuel from the vapor nozzle to the burner tube.

In testimony whereof I affix my signature in presence of two witnesses.

HENRY CLAY FOX.

Witnesses:
 E. E. HARDAWAY,
 J. H. BURLINGAME.